United States Patent
Hatano et al.

(10) Patent No.: US 7,792,630 B2
(45) Date of Patent: Sep. 7, 2010

(54) CONTROL SYSTEM AND METHOD FOR INTERNAL COMBUSTION ENGINE AND ENGINE CONTROL UNIT

(75) Inventors: Junichi Hatano, Saitama-ken (JP); Katsuji Wada, Saitama-ken (JP); Takashi Konomoto, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/052,986

(22) Filed: Mar. 21, 2008

(65) Prior Publication Data
US 2008/0234917 A1 Sep. 25, 2008

(30) Foreign Application Priority Data
Mar. 22, 2007 (JP) ............... 2007-074473

(51) Int. Cl.
*B60T 7/12* (2006.01)
(52) U.S. Cl. .............. 701/103; 701/102; 123/674; 123/673
(58) Field of Classification Search .......... 123/674, 123/494, 673, 406.7, 596; 701/112, 106, 701/101–105; 307/10.2, 10.3; B60T 7/12
See application file for complete search history.

(56) References Cited
U.S. PATENT DOCUMENTS 4,864,998 A * 9/1989 Onishi .............. 123/674

6,012,428 A 1/2000 Yano et al.
6,668,795 B1 12/2003 Shimada et al.
6,999,867 B2 * 2/2006 Konno .............. 701/112

FOREIGN PATENT DOCUMENTS

| EP | 1081364 A2 | 3/2001 |
|---|---|---|
| JP | 2003-090250 | 3/2003 |
| WO | WO-2006/095114 A1 | 9/2006 |

OTHER PUBLICATIONS

European Office Action for Application No. 08004941.4-2311, dated Jul. 7, 2008.

* cited by examiner

*Primary Examiner*—Stephen K Cronin
*Assistant Examiner*—Keith Coleman
(74) *Attorney, Agent, or Firm*—Lahive & Cockfield, LLP; Anthony A. Laurentano, Esq.

(57) ABSTRACT

A control system for an internal combustion engine, which is capable of properly setting fuel injection timing according to the actual degree of delay of the amount of fresh air to be supplied to cylinders of the engine, thereby making it possible to positively suppress torque variation, when the control system has switched an air-fuel ratio mode between a lean mode and a rich mode. The control system controls the air-fuel ratio of a mixture by switching the air-fuel ratio mode. In the lean mode, the control system sets a target fresh air amount for the lean mode, and in the rich mode, it sets a target fresh air amount for the rich mode. Upon switching the air-fuel ratio mode, the control system corrects the fuel injection timing according to the difference between the target fresh air amount for the lean mode or the rich mode and the detected fresh air amount.

3 Claims, 10 Drawing Sheets

CONTROL SYSTEM AND METHOD FOR INTERNAL COMBUSTION ENGINE AND ENGINE CONTROL UNIT

BACKGROUND OF THE INVENTION

1. Field of the Invention

The present invention relates to a control system and method for an internal combustion engine and an engine control unit which control an air-fuel ratio of a mixture to be supplied to cylinders by switching the air-fuel ratio between a leaner side and a richer side.

2. Description of the Related Art

Conventionally, as a control system of this kind, one disclosed in Japanese Laid-Open Patent Publication (Kokai) No. 2003-90250 is known. In this control system, an air-fuel ratio mode is switched between a lean mode that controls the air-fuel ratio of a mixture to a leaner value than the stoichiometric air-fuel ratio, and a rich mode that controls the air-fuel ratio to a richer value than the stoichiometric air-fuel ratio. In the lean mode, a target air-fuel ratio is set according to a target engine torque and the rotational speed of the engine, and a fresh air amount and a fuel injection amount are controlled such that the air-fuel ratio becomes equal to the set target air-fuel ratio. Further, target fuel injection timing is calculated according to the target engine torque and the rotational speed of the engine, and fuel injection timing is controlled based on the calculated target fuel injection timing.

On the other hand, in the rich mode, the target air-fuel ratio is set to a predetermined value. Further, the target fuel injection timing is set to a value obtained by adding a predetermined advanced value to the target fuel injection timing in the lean mode, which is calculated immediately before the air-fuel ratio mode is switched to the rich mode.

Further, when the air-fuel ratio mode has been switched, the target air-fuel ratio is finally calculated by performing predetermined delay processing (weighted average processing) on the target air-fuel ratio calculated as above for the lean or rich mode to which the air-fuel ratio mode has been switched. Similarly, the target fuel injection timing as well is subjected to predetermined delay processing upon switching of the air-fuel ratio mode.

As described above, when the air-fuel ratio mode has been switched between the lean mode and the rich mode which are very different in the air-fuel ratio, a fresh air amount suitable for the rich or lean mode to which the air-fuel ratio mode has been switched is supplied in a delayed manner, and the degree of delay of the fresh air amount is not necessarily uniform since it is changed according to operating conditions of the engine. However, in the above-described conventional control system, when the air-fuel ratio mode has been switched, uniform delay processing set in advance is simply performed on the target fuel injection timing, and therefore fuel injection timing is sometimes set in a manner deviated from the optimum value corresponding to the actual fresh air amount, which causes an increase in torque variation.

SUMMARY OF THE INVENTION

It is an object of the present invention to provide a control system and method for an internal combustion engine and an engine control unit which are capable of properly setting fuel injection timing according to the actual degree of delay of the amount of fresh air to be supplied to cylinders of the engine, thereby making it possible to positively suppress torque variation, when the control system has switched an air-fuel ratio mode between a lean mode and a rich mode.

To attain the above object, in a first aspect of the present invention, there is provided a control system for an internal combustion engine, for controlling an amount of fresh air to be supplied to a cylinder and an amount of fuel to be supplied to the cylinder to thereby control an air-fuel ratio of a mixture in the cylinder such that an air-fuel ratio mode is switched between a lean mode in which the air-fuel ratio is controlled toward a leaner side and a rich mode in which the air-fuel ratio is controlled toward a richer side than in the lean mode, comprising fresh air amount-detecting means for detecting the amount of fresh air, lean-mode target fresh air amount-setting means for setting a target fresh air amount for the lean mode, which serves as a target of the fresh air amount in the lean mode, rich-mode target fresh air amount-setting means for setting a target fresh air amount for the rich mode, which serves as a target of the fresh air amount in the rich mode, operating condition-detecting means for detecting an operating condition of the engine, fuel injection timing-setting means for setting fuel injection timing of the fuel to be supplied to the cylinder according to the detected operating condition of the engine, and fuel injection timing-correcting means for correcting the fuel injection timing according to a difference between the target fresh air amount for the lean mode or the target fresh air amount for the rich mode, and the detected fresh air amount, upon switching of the air-fuel ratio mode.

With the configuration of the control system according to the first aspect of the present invention, the air-fuel ratio mode is switched between the lean mode in which the air-fuel ratio of the mixture is controlled to the leaner side and the rich mode in which the air-fuel ratio of the mixture is controlled to the richer side than in the lean mode. As a target value of the amount of fresh air to be supplied to cylinder, the target fresh air amount for the lean mode is set in the lean mode, and the target fresh air amount for the rich mode is set in the rich mode. Further, the fuel injection timing of the fuel to be supplied to the cylinder is set according to the detected operating condition of the engine. When the air-fuel ratio mode has been switched, the fuel injection timing is corrected according to the difference between the target fresh air amount for the lean mode or the rich mode, and the detected fresh air amount.

The above-described difference between the target fresh air amount for the lean mode or the rich mode and the detected fresh air amount represents the actual degree of delay of the amount of fresh air supplied upon switching of the air-fuel ratio mode. Therefore, by correcting the fuel injection timing according to the above-described difference, it is possible to set the fuel injection timing according to the actual degree of delay of the fresh air amount, thereby making it possible to positively suppress torque variation caused upon switching of the air-fuel ratio.

To attain the above object, in a second aspect of the present invention, there is provided a control method for an internal combustion engine, for controlling an amount of fresh air to be supplied to a cylinder and an amount of fuel to be supplied to the cylinder to thereby control an air-fuel ratio of a mixture in the cylinder such that an air-fuel ratio mode is switched between a lean mode in which the air-fuel ratio is controlled toward a leaner side and a rich mode in which the air-fuel ratio is controlled toward a richer side than in the lean mode, comprising a fresh air amount-detecting step of detecting the amount of fresh air, a lean-mode target fresh air amount-setting step of setting a target fresh air amount for the lean mode, which serves as a target of the fresh air amount in the lean mode, a rich-mode target fresh air amount-setting step of setting a target fresh air amount for the rich mode, which serves as a target of the fresh air amount in the rich mode, an operating condition-detecting step of detecting an operating condition of the engine, a fuel injection timing-setting step of setting fuel injection timing of the fuel to be supplied to the cylinder according to the detected operating condition of the engine, and a fuel injection timing-correcting step of correcting the fuel injection timing according to a difference between the target fresh air amount for the lean mode or the target fresh air amount for the rich mode, and the detected fresh air amount, upon switching of the air-fuel ratio mode.

With the configuration of the method according to the second aspect of the present invention, it is possible to obtain the same advantageous effects as provided by the first aspect of the present invention.

To attain the above object, in a third aspect of the present invention, there is provided an engine control unit including a control program for causing a compute to execute a control method for an internal combustion engine, for controlling an amount of fresh air to be supplied to a cylinder and an amount of fuel to be supplied to the cylinder to thereby control an air-fuel ratio of a mixture in the cylinder such that an air-fuel ratio mode is switched between a lean mode in which the air-fuel ratio is controlled toward a leaner side and a rich mode in which the air-fuel ratio is controlled toward a richer side than in the lean mode, comprising a fresh air amount-detecting step of detecting the amount of fresh air, a lean-mode target fresh air amount-setting step of setting a target fresh air amount for the lean mode, which serves as a target of the fresh air amount in the lean mode, a rich-mode target fresh air amount-setting step of setting a target fresh air amount for the rich mode, which serves as a target of the fresh air amount in the rich mode, an operating condition-detecting step of detecting an operating condition of the engine, a fuel injection timing-setting step of setting fuel injection timing of the fuel to be supplied to the cylinder according to the detected operating condition of the engine, and a fuel injection timing-correcting step of correcting the fuel injection timing according to a difference between the target fresh air amount for the lean mode or the target fresh air amount for the rich mode, and the detected fresh air amount, upon switching of the air-fuel ratio mode With the configuration of the engine control unit according to the third aspect of the present invention, it is possible to obtain the same advantageous effects as provided by the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
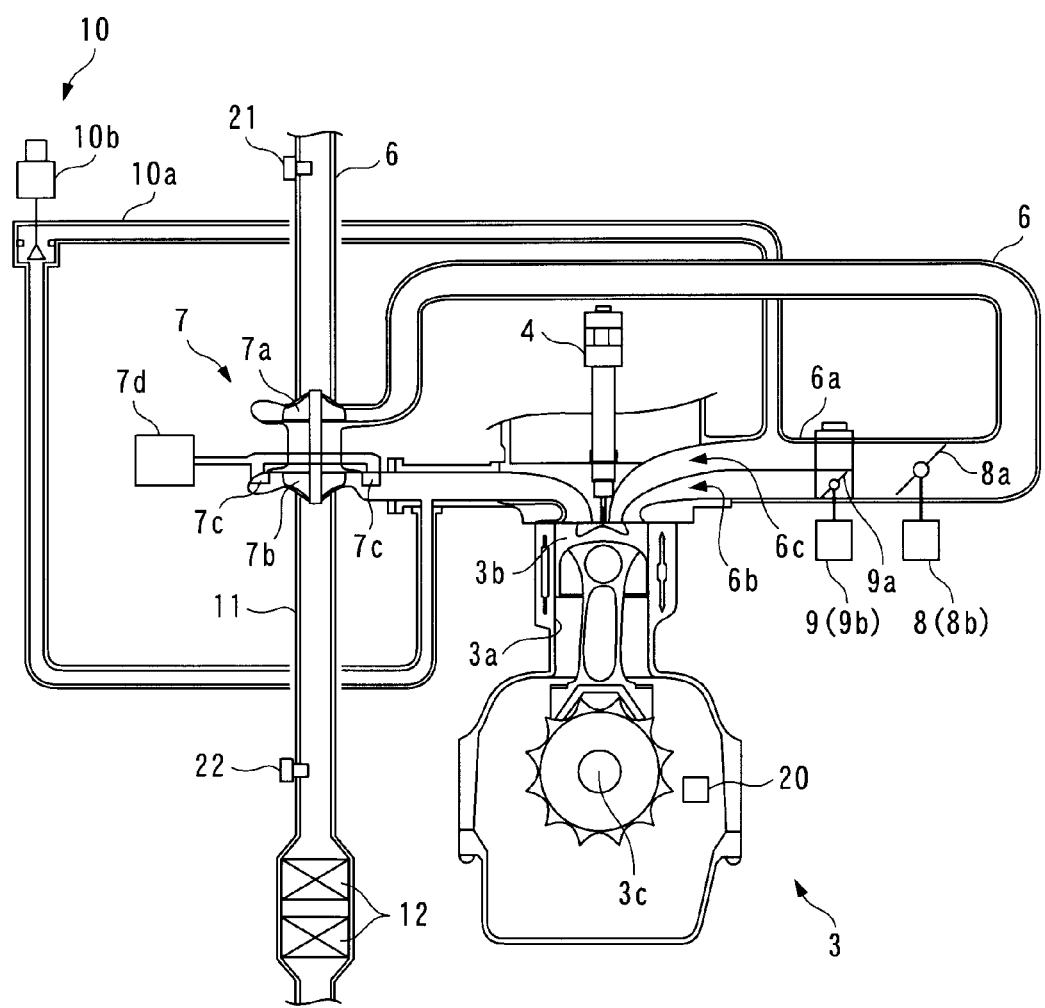
FIG. 1 is a schematic diagram of an internal combustion engine to which is applied a control system according to an embodiment of the present invention.
Figure 2:
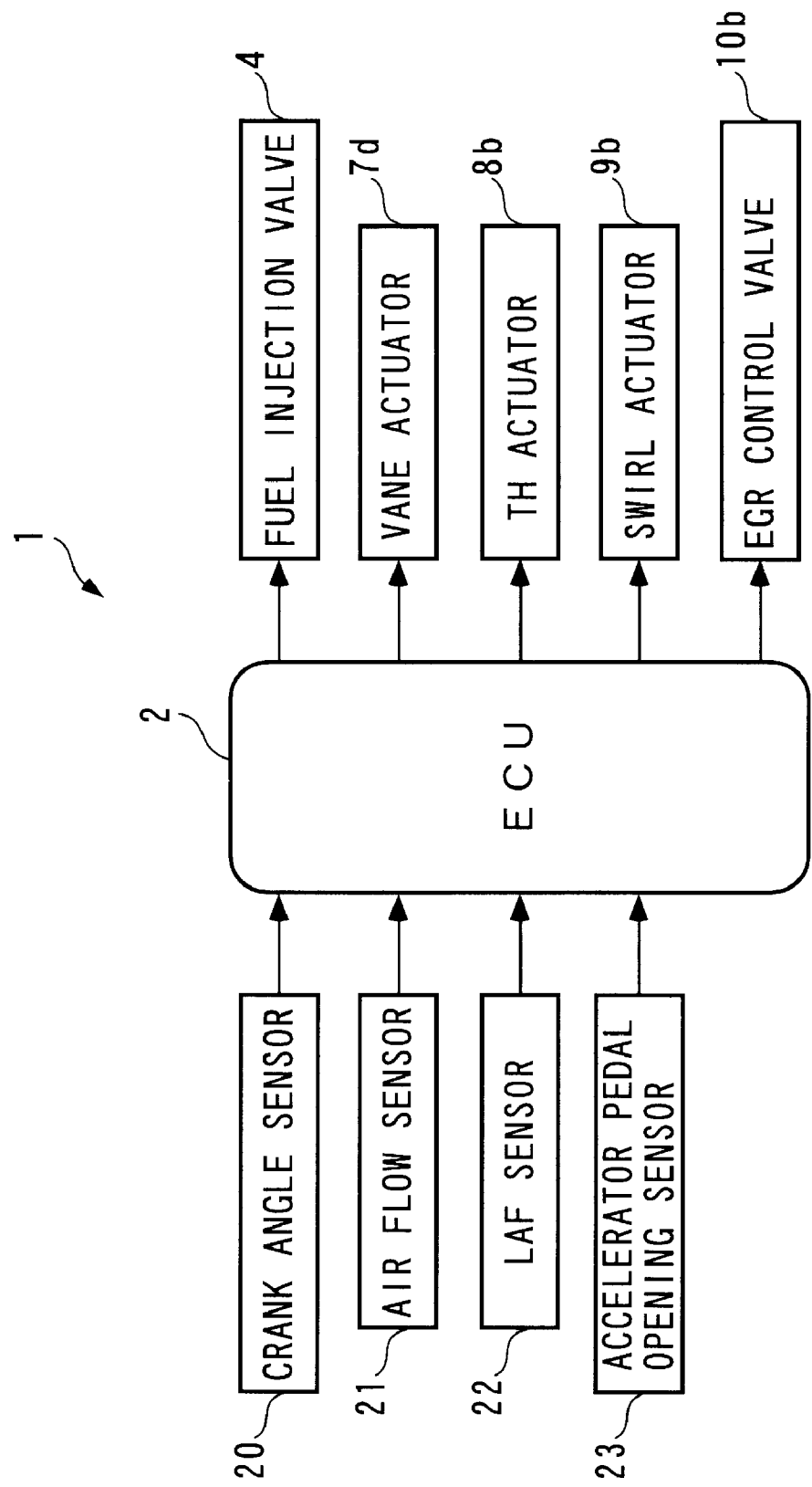
FIG. 2 is a schematic block diagram of the control system.

Hereafter, a control system for an internal combustion engine, according to an embodiment of the present invention will be described with reference to the drawings. FIG. 1 schematically shows the arrangement of the internal combustion engine (hereinafter referred to as "the engine") 3 to which is applied the control system 1 according to the present embodiment. FIG. 2 schematically shows the control system 1. Referring to FIG. 2, the control system 1 includes an ECU 2. As described hereinafter, the ECU 2 carries out various control processes for controlling an air-fuel ratio, fuel injection timing and so forth, depending on operating conditions of the engine 3.

The engine 3 is an in-line four-cylinder diesel engine installed on a vehicle (not shown), and includes four pairs of cylinders 3a and pistons 3b (only one pair of which is shown), a crankshaft 3c, and so forth. The engine 3 is provided with a crank angle sensor 20. The crank angle sensor 20 (operating condition-detecting means) delivers a CRK signal and a TDC signal, which are both pulse signals, to the ECU 2 in accordance with rotation of the crankshaft 3c.

The CRK signal is delivered whenever the crankshaft 3c rotates through a predetermined angle (e.g. 30°). The ECU 2 calculates the rotational speed NE of the engine 3 (hereinafter referred to as "the engine speed NE") based on the CRK signal. The TDC signal indicates that each piston 3b in the associated cylinder 3a is in a predetermined crank angle position slightly before the TDC position at the start of the intake stroke, and is delivered whenever the crankshaft 3c rotates through a predetermined crank angle.

Further, the engine 3 includes fuel injection valves 4 (only one of which is shown) provided for the respective cylinders 3a. The valve-opening time period, the valve-opening timing and the valve-closing timing of each fuel injection valve 4 are controlled by a drive signal from the ECU 2, whereby a fuel injection amount QINJ and fuel injection timing φINJ of fuel injected from the fuel injection valve 4 are controlled.

An air flow sensor 21, a turbocharger 7, a throttle valve mechanism 8, and a swirl valve mechanism 9 are provided at respective locations of an intake passage 6 of the engine 3 from upstream to downstream in the mentioned order. The air flow sensor 21 (fresh-air amount-detecting means) detects the flow rate of fresh air flowing through a throttle valve 8a, described hereinafter, and delivers a signal indicative of the sensed fresh air flow rate to the ECU 2. The ECU 2 calculates the amount QAIR of fresh air drawn into each cylinder 3a (hereinafter referred to as "the actual fresh air amount QAIR") based on the signal from the air flow sensor 21.

Further, the turbocharger 7 is comprised of a compressor blade 7a disposed in the intake passage 6 at a location downstream of the air flow sensor 21, a turbine blade 7b disposed in an exhaust passage 11, for rotating in unison with the compressor blade 7a, a plurality of variable vanes 7c (only two of which are shown), and a vane actuator 7d for actuating the variable vanes 7c.

In the turbocharger 7, as the turbine blade 7b is driven for rotation by exhaust gases flowing through the exhaust passage 11, the compressor blade 7a rotates in unison with the turbine blade 7b, whereby fresh air within the intake passage 6 is pressurized. In short, supercharging is carried out.

Further, the variable vanes 7c change the magnitude of boost pressure generated by the turbocharger 7, and are pivotally mounted on a wall of a turbine blade-accommodating portion of a housing. The degree of opening of the variable vanes 7c is controlled by a drive signal from the ECU 2, whereby the amount of exhaust gases blown to the turbine blade 7b is changed to change the rotational speeds of the turbine blade 7b and the compressor blade 7a, to thereby control the boost pressure.

On the other hand, the throttle valve mechanism 8 includes a throttle valve 8a pivotally disposed in an intermediate portion of the intake passage 6, and a TH actuator 8b for actuating the throttle valve 8a. The operation of the TH actuator 8b is controlled by a drive signal from the ECU 2 to control the degree of opening of the throttle valve 8a, whereby the flow rate of fresh air flowing through the throttle valve 8a is controlled.

Further, a portion of the intake passage 6 downstream of the throttle valve mechanism 8 forms an intake manifold 6a comprised of a collecting section and four branch portions branching therefrom. A passage within the intake manifold 6a is divided into a swirl passage 6b and a bypass passage 6c between the collecting section and each branch portion. The passages 6b and 6c communicate with an associated one of the cylinders 3a via each intake port.

The swirl valve mechanism 9 stirs a mixture in each cylinder 3a by generating a swirl in the cylinder 3a, and is comprised of a swirl valve 9a disposed in the swirl passage 6b, and a swirl actuator 9b for actuating the swirl valve 9a. The operation of the swirl actuator 9b is controlled by a drive signal from the ECU 2 to change the degree of opening of the swirl valve 9a, whereby the generated state of the swirl is controlled.

Further, the engine 3 is provided with an exhaust gas recirculation system 10. The exhaust gas recirculation system 10 recirculates part of exhaust gases flowing through the exhaust passage 11 toward the intake passage 6, and is comprised of an EGR passage 10a connected between the intake passage 6 and the exhaust passage 11, and an EGR control valve 10b for opening and closing the EGR passage 10a. The EGR passage 10a has one end opening in a portion of the exhaust passage 11 upstream of the turbine blade 7b, and the other end opening in a portion of the bypass passage 6c of the intake passage 6.

The EGR control valve 10b is implemented by a linear solenoid valve a valve lift of which is linearly changed. The lift of the EGR control valve 10b is controlled by a drive signal from the ECU 2 to change the opening of the EGR passage 10a, whereby the amount of exhaust recirculation is controlled (EGR control).

Further, a LAF sensor 22 and an exhaust purifying catalyst 12 are provided in the exhaust passage 11 at respective locations downstream of the turbine blade 7b from upstream to downstream in the mentioned order. The LAF sensor 22 linearly detects the concentration of oxygen in exhaust gases flowing through the exhaust passage 11, in a broad air-fuel ratio range from a rich region richer than a stoichiometric air-fuel ratio to a very lean region, and delivers a signal indicative of the sensed oxygen concentration to the ECU 2.

The ECU 2 calculates the air-fuel ratio in the exhaust gases, that is, the air-fuel ratio AF of the mixture, based on the signal from the LAF sensor 22.

Further, the exhaust purifying catalyst 12 is held in an activated state when the temperature thereof is not lower than a predetermined activating temperature, and decreases NOx, HC and CO contained in exhaust gases flowing through the exhaust passage 11.

An accelerator pedal opening sensor 23 (operating condition-detecting means) detects a stepped-on amount AP of an accelerator pedal, not shown, of the vehicle (hereinafter referred to as "the accelerator pedal opening AP") and delivers a signal indicative of the sensed accelerator pedal opening AP to the ECU 2.

The ECU 2 is implemented by a microcomputer comprised of a CPU, a RAM, a ROM and an I/O interface (none of which are specifically shown). The ECU 2 determines an operating condition of the engine 3 in response to the signals from the aforementioned sensors 20 to 23, and based on the determined operating condition of the engine, performs engine control for controlling the air-fuel ratio AF of a mixture supplied to the cylinders 3a of the engine 3 and the fuel injection timing φINJ. More specifically, during normal operation of the engine 3, the air-fuel ratio AF is controlled to a leaner value than the stoichiometric air-fuel ratio by setting an air-fuel ratio mode to a lean mode. Further, when rich spike control is carried out for reducing NOx trapped in the exhaust purifying catalyst 12, the air-fuel ratio AF is temporarily controlled to a richer value than the stoichiometric air-fuel ratio by setting the air-fuel ratio mode to a rich mode. It should be noted that in the present embodiment, the ECU 2 corresponds to lean-mode target fresh air amount-setting means, rich-mode target fresh air amount-setting means, fuel injection timing-setting means, and fuel injection timing-correcting means.

Figure 3:
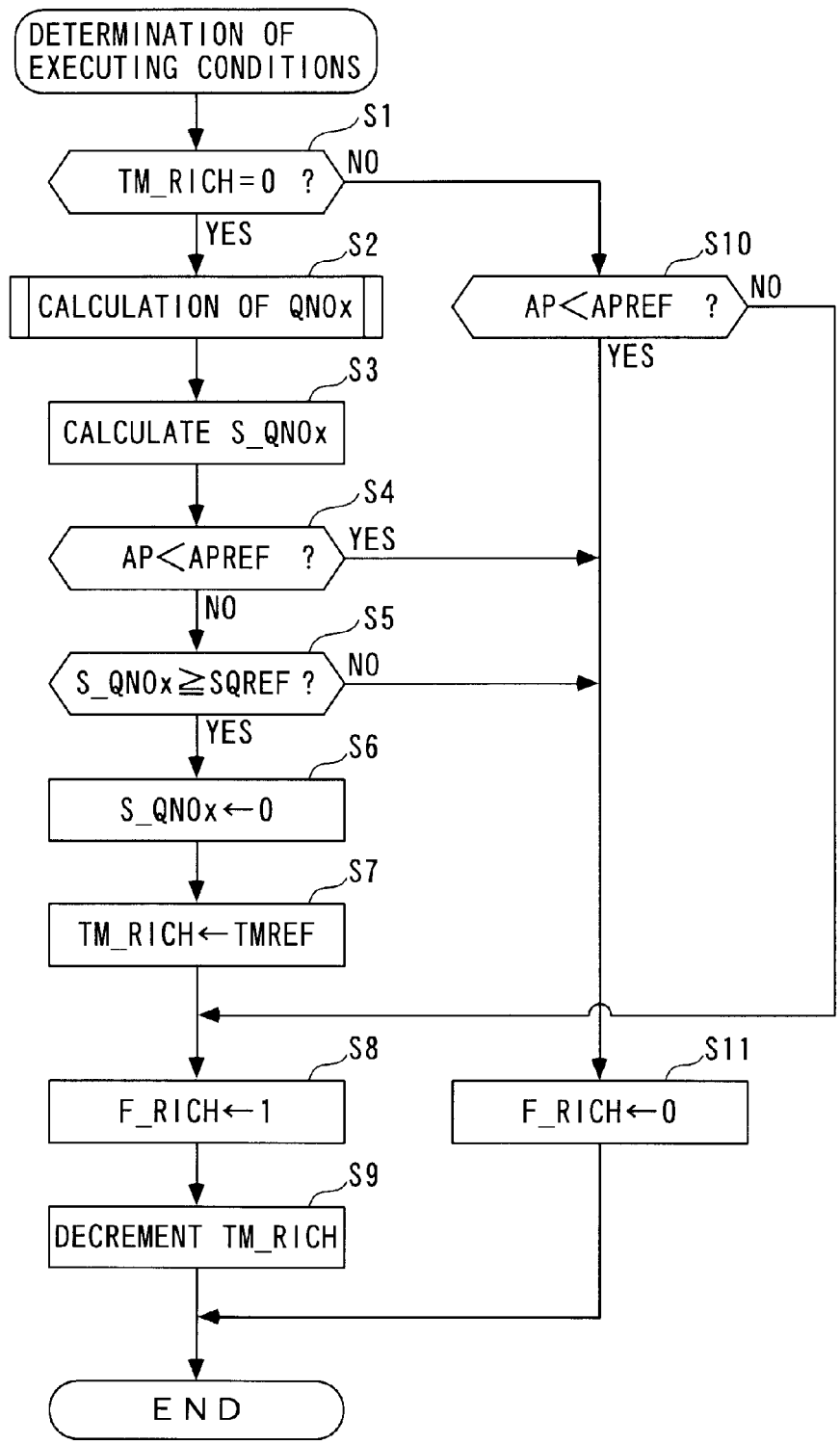
FIG. 3 is a flowchart of an executing condition-determining process for determining whether or not conditions for executing rich spike control are satisfied.

FIG. 3 is a flowchart of an executing condition-determining process for determining whether or not conditions for executing the rich spike control are satisfied. The executing condition-determining process is executed at a predetermined period (e.g. 10 msec). In this process, first, in a step 1 (shown as S1 in abbreviated form in FIG. 3; the following steps are also shown in abbreviated form), it is determined whether or not the timer value TM_RICH of a rich timer is equal to 0. As described hereinafter, the rich timer counts time over which the rich spike control is executed, and the timer value TM_RICH thereof is reset to 0 at the start of the engine 3.

If the answer to the question of the step 1 is affirmative (YES), i.e. if the rich spike control is not being executed, the process proceeds to a step 2, wherein an exhausted NOx amount QNOx is calculated by searching a map (not shown) according to demanded torque PMCMD and the engine speed NE. It should be noted that the demanded torque PMCMD is calculated according to the engine speed NE and the accelerator pedal opening AP.

Next, the process proceeds to a step 3, wherein a trapped NOx amount S_QNOx is calculated. The trapped NOx amount S_QNOx corresponds to an estimated value of the amount of NOx trapped in the exhaust purifying catalyst 12, and is calculated as the cumulative value of the exhausted NOx amount QNOx. More specifically, the trapped NOx amount S_QNOx is calculated by adding the exhausted NOx amount QNOx obtained in the step 2 to the immediately preceding value of the trapped NOx amount.

In a step 4 following the step 3, it is determined whether or not the accelerator pedal opening AP is smaller than a predetermined value APREF. The predetermined value APREF is provided for determining whether or not the accelerator pedal is stepped on, and is set to 1°, for example.

If the answer to this question is affirmative (YES), i.e. if the accelerator pedal is not stepped on, it is judged that the conditions for executing the rich spike control are not satisfied, and the rich spike control is not executed, and to indicate the fact, a rich spike flag F_RICH is set to 0 in a step 11, followed by terminating the present process.

On the other hand, if the answer to the question of the step 4 is negative (NO), i.e. if the accelerator pedal is stepped on, the process proceeds to a step 5, wherein it is determined whether or not the trapped NOx amount S_QNOx is not smaller than a predetermined value SQREF. If the answer to this question is negative (NO), it is judged that the rich spike control is not executed, and the step 11 is executed, followed by terminating the present process.

On the other hand, if the answer to the question of the step 5 is affirmative (YES), it is judged that the conditions for executing the rich spike control are satisfied, and the trapped NOx amount S_QNOx is set to 0 in a step 6. Then, in a step 7, the timer value TM_RICH of the rich timer is set to a predetermined value TMREF (corresponding to e.g. 5 sec).

Next, the process proceeds to a step 8, wherein the rich spike flag F_RICH is set to 1. Then, in a step 9, the timer value TM_RICH of the rich timer is decremented, followed by terminating the present process.

On the other hand, if the answer to the question of the step 1 is negative (NO), i.e. if the rich spike control is being executed, the process proceeds to a step 10, wherein similarly to the step 4, it is determined whether or not the accelerator pedal opening AP is smaller than the predetermined value APREF. If the answer to this question is negative (NO), it is judged that the rich spike control is continued, and the steps 8 and 9 are executed, followed by terminating the present process.

On the other hand, if the answer to the question of the step 10 is affirmative (YES), i.e. if the accelerator pedal ceases to be stepped on, it is judged that the rich spike control should be stopped, and the step 11 is executed, followed by terminating the present process.

Figure 4:
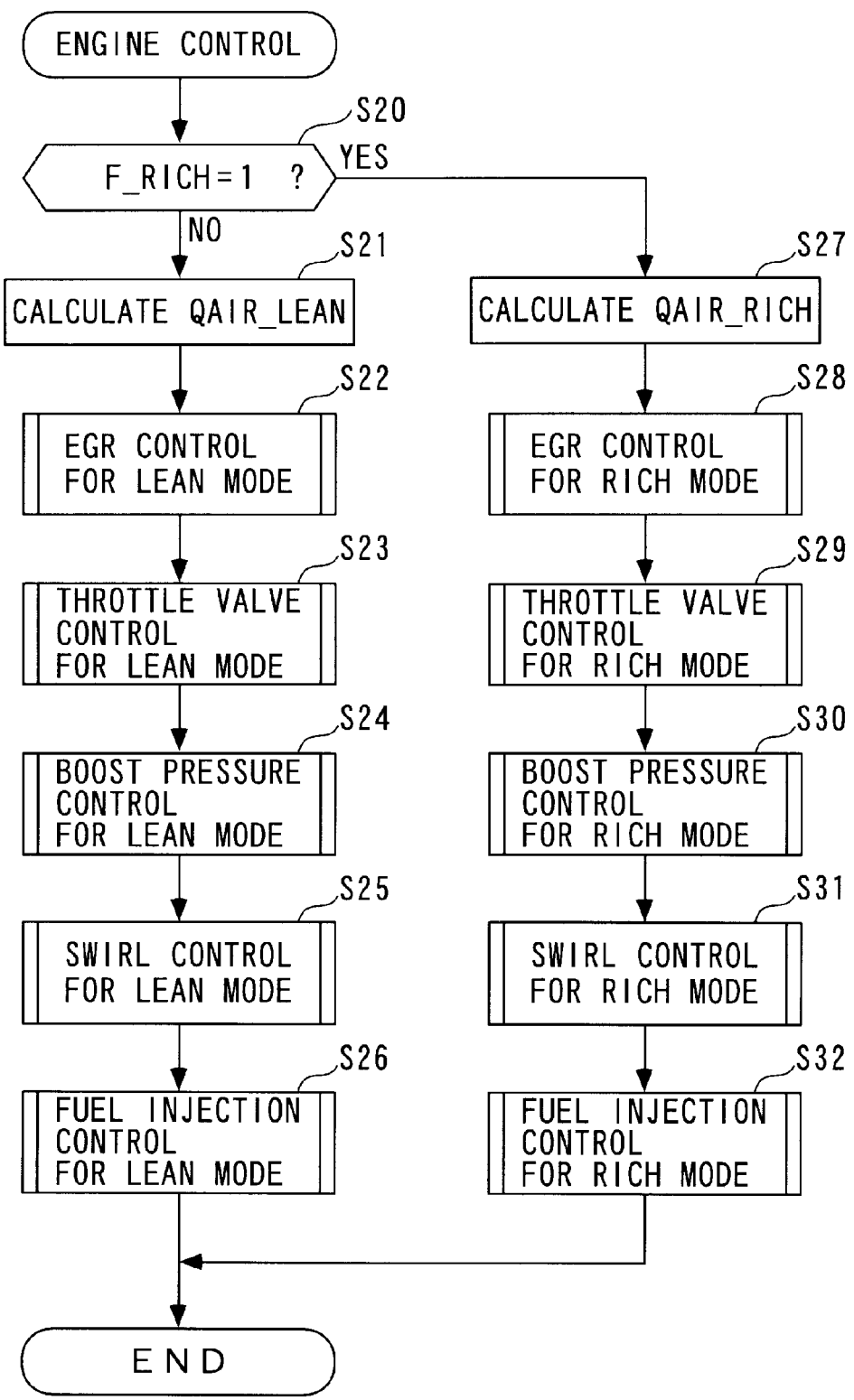
FIG. 4 is a flowchart of an engine control process.

FIG. 4 is a flowchart of the engine control process. This process is for controlling the air-fuel ratio of a mixture supplied to the cylinders 3$a$ by executing fresh air amount control and fuel injection control according to the result of the FIG. 3 executing condition-determining process, and is carried out in synchronism with generation of the TDC signal.

In this process, first, in a step 20, it is determined whether or not the aforementioned rich spike flag F_RICH is equal to 1. If the answer to this question is negative (NO), i.e. if the rich spike control is not executed, an engine control process for the lean mode is carried out in steps 21 to 26. First, in the step 21 is calculated a target fresh air amount QAIR_LEAN for the lean mode (hereinafter referred to as "the lean target fresh air amount QAIR_LEAN"), which is the target of the actual fresh air amount QAIR in the lean mode. More specifically, the lean target fresh air amount QAIR_LEAN is calculated by searching a map (not shown) according to the demanded torque PMCMD and the engine speed NE.

Next, fresh air amount control for the lean mode is carried out in the steps 22 to 25. First, an EGR control process for the lean mode is carried out in the step 22. More specifically, the lift of the EGR control valve 10$b$ is controlled with a predetermined feedback control algorithm such that the actual fresh air amount QAIR converges to the lean target fresh air amount QAIR_LEAN.

Then, in the step 23, a throttle valve control process for the lean mode is carried out. More specifically, a target throttle valve opening TH_CMD is set to a predetermined WOT (Wide-Open Throttle) value TH_WOT, and a control input corresponding to the target throttle valve opening TH_CMD is supplied to the TH actuator 8$b$, whereby the throttle valve 8$a$ is controlled to a fully-open state.

Next, in the step 24, a boost pressure control process for the lean mode is performed. More specifically, a target vane opening of the variable vanes 7$c$ for the lean mode is calculated by searching a map (not shown) according to the demanded torque PMCMD and the engine speed NE, and a control input corresponding to the target vane opening for the lean mode is supplied to the vane actuator 7$d$, whereby boost pressure is controlled.

Then, in the step 25, a swirl control process for the lean mode is carried out. More specifically, a target swirl opening of the swirl valve 9$a$ for the lean mode is calculated by searching a map (not shown) according to the demanded torque PMCMD and the engine speed NE, and a control input corresponding to the target swirl opening for the lean mode is supplied to the swirl actuator 9$b$, whereby the swirl is controlled.

Next, the process proceeds to the step 26, wherein a fuel injection control process for the lean mode is carried out to thereby calculate the fuel injection amount QINJ (fuel amount) and the fuel injection timing $\phi$INJ, followed by terminating the present process.

Figure 8:
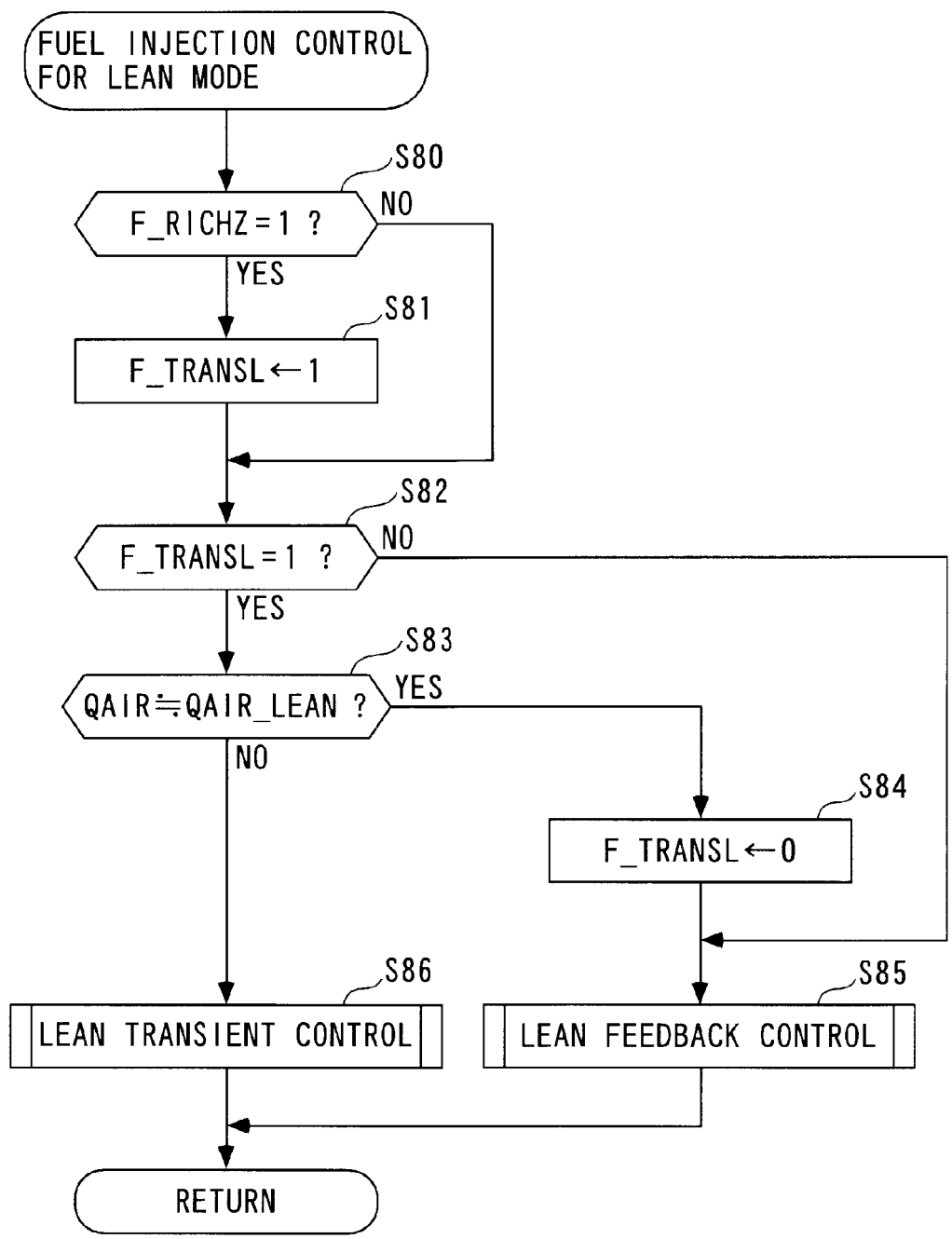
FIG. 8 is a flowchart of a fuel injection control process for a lean mode.

This fuel injection control process for the lean mode is carried out by a subroutine shown in FIG. 8. First, in a step 80, it is determined whether or not the immediately preceding value F_RICHZ of the rich spike flag used in the immediately preceding loop is equal to 1. If the answer to this question is affirmative (YES), i.e. if this is a first loop after switching from the rich mode to the lean mode, the process proceeds to a step 81, wherein a lean transient control flag F_TRANSL is set to 1, followed by the process proceeding to a step 82. On the other hand, if the answer to the question of the step 80 is negative (NO), the process directly proceeds to the step 82.

In the step 82, it is determined whether or not the lean transient control flag F_TRANSL is equal to 1. If the answer to this question is negative (NO), the process proceeds to a step 85, wherein lean feedback control is performed, followed by terminating the present process.

Figure 9:
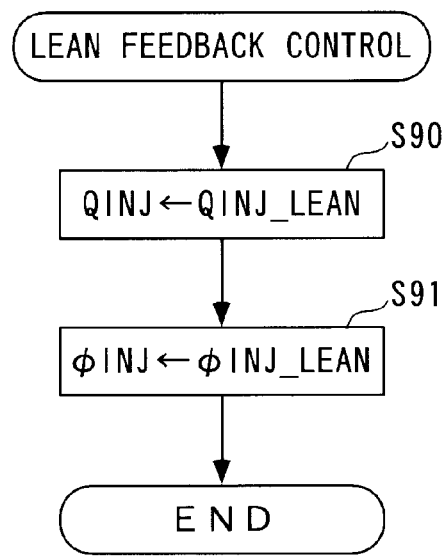
FIG. 9 is a flowchart of a lean feedback control process.

FIG. 9 shows a subroutine of the lean feedback control process. First, in a step 90, the fuel injection amount QINJ is set to a lean fuel injection amount QINJ_LEAN for the lean mode. The lean fuel injection amount QINJ_LEAN for the lean mode is calculated by correcting a basic fuel injection amount, which is calculated by searching a map (not shown) according to the demanded torque PMCMD and the engine speed NE, according to various operating condition parameters (e.g. an engine coolant temperature).

Next, in a step 91, the fuel injection timing $\phi$INJ is set to a lean fuel injection timing $\phi$INJ_LEAN for the lean mode, followed by terminating the present process. The lean fuel injection timing $\phi$INJ_LEAN for the lean mode is calculated by searching a map (not shown) according to the fuel injection amount QINJ set in the step 90 and the engine speed NE.

Referring again to FIG. 8, if the answer to the question of the step 82 is affirmative (YES), i.e. if the lean transient control flag F_TRANSL is equal to 1, the process proceeds to a step 83, wherein it is determined whether or not the actual fresh air amount QAIR detected by the air flow sensor 21 is approximately equal to the lean target fresh air amount QAIR_LEAN calculated in the aforementioned step 21.

If the answer to this question is negative (NO), the process proceeds to a step 86, wherein lean transient control is carried out, followed by terminating the present process.

Figure 10:
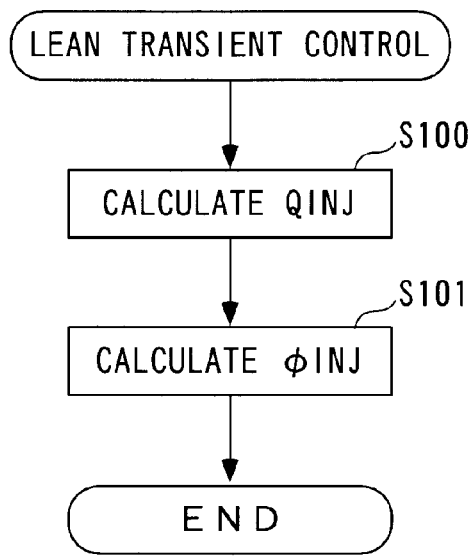
FIG. 10 is a flowchart of a lean transient control process.

FIG. 10 shows a subroutine of the lean transient control. First, in a step 100, the fuel injection amount QINJ is calculated. More specifically, first, a correction term QINJ_CR of the fuel injection amount QINJ is calculated by the following equation (1):

$$QINJ\_CR = \frac{QINJ\_RICH - QINJ\_LEAN}{T} \quad (1)$$

wherein, QINJ_RICH represents a rich fuel injection amount for the rich mode, referred to hereinafter, which was calculated immediately before the rich mode has been switched to the lean mode. Further, T represents a predetermined time period (e.g. 2 sec), which corresponds to a time period taken by the actual fresh air amount QAIR to converge to the lean target fresh air amount QAIR_LEAN after the rich mode has been switched to the lean mode.

Next, the fuel injection amount QINJ is calculated by the following equation (2):

$$QINJ=QINJZ-QINJ\_CR \quad (2)$$

wherein QINJZ represents the immediately preceding value of the fuel injection amount QINJ.

As described above, during execution of the lean transient control, the fuel injection amount QINJ is calculated such that it is progressively decreased, by subtracting the fixed correction term QINJ_CR from the immediately preceding value QINJZ, each time during a predetermined time period T, with the rich fuel injection amount QINJ_RICH for the rich mode, which was calculated immediately before the rich mode has been switched to the lean mode, as an initial value thereof.

Next, the process proceeds to a step 101, wherein the fuel injection timing φINJ is calculated, followed by terminating the present process.

Figure 11A:
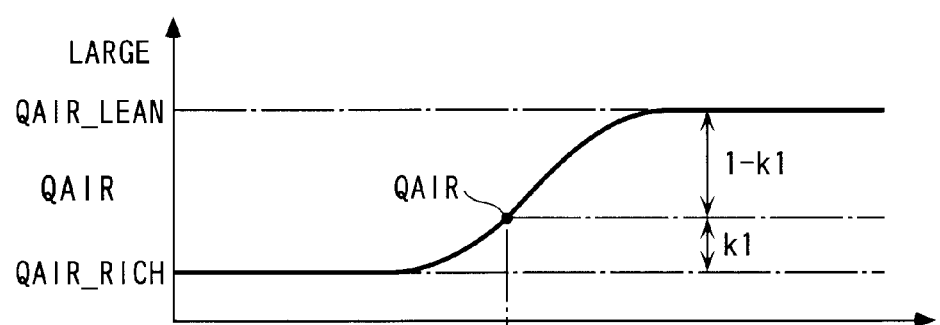
FIGS. 11A and 11B are timing diagrams showing the relationship between an actual fresh air amount and fuel injection timing, obtained by the lean transient control process.

More specifically, first, a correction coefficient k1 of the fuel injection timing φINJ is calculated by the following equation (3):

$$k1 = \frac{QAIR - QAIR\_RICH}{QAIR\_LEAN - QAIR\_RICH} \quad (3)$$

wherein, QAIR_RICH represents a target fresh air amount for the rich mode (hereinafter referred to as "the rich target fresh air amount"), and is calculated in the rich mode, as described hereinafter, such that it becomes a target of the fresh air amount. In the present case, there is used a value of the target fresh air amount QAIR_RICH calculated immediately before the rich mode has been switched to the lean mode. As is clear from the equation (3), and further as shown in FIG. 11A, the correction coefficient k1 represents a degree of approach of the actual fresh air amount QAIR to the lean target fresh air amount QAIR_LEAN from the rich target fresh air amount QAIR_RICH, more precisely, a ratio of the difference between the actual fresh air amount QAIR and the rich target fresh air amount QAIR_RICH to the difference between the lean target fresh air amount QAIR_LEAN and the rich target fresh air amount QAIR_RICH, and 1-k1 represents a non-reach ratio thereof, that is, a degree of deviation of the actual fresh air amount QAIR from the lean target fresh air amount QAIR_LEAN, more precisely, a ratio of the difference between the actual fresh air amount QAIR and the lean target fresh air amount QAIR_LEAN to the difference between the lean target fresh air amount QAIR_LEAN and the rich target fresh air amount QAIR_RICH. For example, the correction coefficient k1 represents that as the value thereof is closer to 0, the actual fresh air amount QAIR is closer to the rich target fresh air amount QAIR_RICH, whereas as the value thereof is closer to 1, the actual fresh air amount QAIR is closer to the lean target fresh air amount QAIR_LEAN.

Figure 11B:
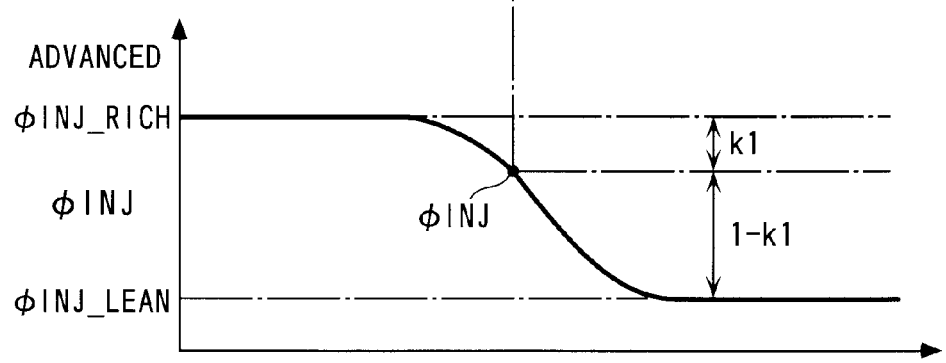

Next, the fuel injection timing φINJ is calculated by the following equation (4):

$$\phi INJ = \phi INJ\_RICH - k1(\phi INJ\_RICH - \phi INJ\_LEAN) \quad (4)$$

wherein, φINJ_RICH represents rich fuel injection timing calculated by searching a map in the rich mode, as described hereinafter, and in the present case, there is used a value of the rich fuel injection timing φINJ_RICH calculated immediately before the rich mode has been switched to the lean mode. The second term (k1(φINJ_RICH−φINJ_LEAN)) on the right side of the equation (4) represents the amount of correction of the fuel injection timing φINJ corresponding to the above-mentioned degree of approach of the actual fresh air amount QAIR to the lean target fresh air amount QAIR_LEAN. By subtracting the second term from the rich fuel injection timing φINJ_RICH for the rich mode using the equation (4), the fuel injection timing φINJ is corrected such that the degree of correction thereof matches the above-mentioned degree of approach of the actual fresh air amount QAIR to the lean target fresh air amount QAIR_LEAN (see FIG. 11B). Therefore, by correcting the fuel injection timing φINJ as described above, it is possible to set the fuel injection timing φINJ to an appropriate value corresponding to the actual degree of delay of the actual fresh air amount QAIR.

Referring again to FIG. 8, if the answer to the question of the step 83 is affirmative (YES), i.e. if the actual fresh air amount QAIR has converged to the lean target fresh air amount QAIR_LEAN, it is judged that the lean transient control should be terminated, and in a step 84, the lean transient control flag F_TRANSL is set to 0. Then, the process proceeds to the aforementioned step 85, wherein the above-described lean feedback control is carried out.

Referring again to FIG. 4, if the answer to the question of the step 20 is affirmative (YES), i.e. if the conditions for executing the rich spike control are satisfied, an engine control process for the rich mode is executed in steps 27 to 32. First, in the step 27, the rich target fresh air amount QAIR_RICH is calculated by searching a map (not shown) according to the demanded torque PMCMD and the engine speed NE. In this map, the rich target fresh air amount QAIR_RICH is set to a value smaller than the lean target fresh air amount QAIR_LEAN in the whole regions of the demanded torque PMCMD and the engine speed NE.

Figure 5:
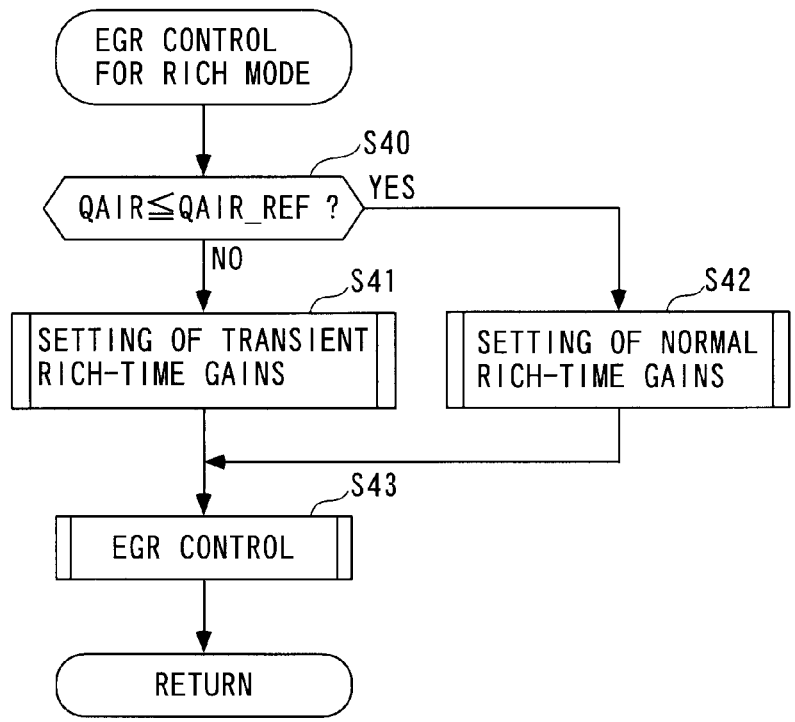
FIG. 5 is a flowchart of an EGR control process for a rich mode.

Next, a fresh air amount control process for the rich mode is carried out in the steps 28 to 31. First, in the step 28, an EGR control process for the rich mode is executed. This process is performed by a subroutine shown in FIG. 5. First, in a step 40 in FIG. 5, it is determined whether or not the actual fresh air amount QAIR is not larger than a threshold value QAIR_REF. The threshold value QAIR_REF is provided for determining whether or not the actual fresh air amount QAIR has been reduced to a value close to the rich target fresh air amount QAIR_RICH. The threshold value QAIR_REF is set to a slightly larger value than the rich target fresh air amount QAIR_RICH by adding a predetermined value thereto.

If the answer to the question of the step 40 is negative (NO), i.e. if the degree of deviation of the actual fresh air amount QAIR from the rich target fresh air amount QAIR_RICH is large, the process proceeds to a step 41, wherein a plurality of transient rich-time feedback gains are set. More specifically, these feedback gains are calculated by searching a plurality of corresponding transient rich-time maps (not shown) according to the demanded torque PMCMD and the engine speed NE, respectively.

On the other hand, if the answer to the question of the step 40 is affirmative (YES), i.e. if the actual fresh air amount QAIR has been reduced to a value close to the rich target fresh air amount QAIR_RICH, the process proceeds to a step 42, wherein a plurality of normal rich-time feedback gains are set. More specifically, these feedback gains are calculated by searching a plurality of corresponding normal rich-time maps (not shown) according to the demanded torque PMCMD and the engine speed NE, respectively.

In the normal rich-time maps, the normal rich-time feedback gains are set to values smaller than the corresponding transient rich-time feedback gains, respectively. This is to increase the convergence rate of the actual fresh air amount QAIR to the rich target fresh air amount QAIR_RICH when the degree of deviation of the actual fresh air amount QAIR from the rich target fresh air amount QAIR_RICH is large, and prevent overshooting and the like to improve the convergence of the actual fresh air amount QAIR when the actual fresh air amount QAIR has converged to a value close to the rich target fresh air amount QAIR_RICH.

In a step 43 following the step 41 or 42, the EGR control process is performed. More specifically, the lift of the EGR control valve 10b is controlled with a predetermined feedback control algorithm (e.g. a PID control algorithm) using the transient rich-time or normal rich-time feedback gains set in the steps 41 or 42, such that the actual fresh air amount QAIR converges to the rich target fresh air amount QAIR_RICH, followed by terminating the present process.

Referring again to FIG. 4, in the step 29 following the step 28, a throttle valve control process for the rich mode is carried out. This process is executed by a subroutine shown in FIG. 6. First, in a step 50 in FIG. 6, similarly to the aforementioned step 40, it is determined whether or not the actual fresh air amount QAIR is not larger than the threshold value QAIR_REF.

If the answer to this question is negative (NO), i.e. if the degree of deviation of the actual fresh air amount QAIR from the rich target fresh air amount QAIR_RICH is large, the process proceeds to a step 51, wherein a first opening TH_MAP1 is calculated. The first opening TH_MAP1 is calculated by searching a map (not shown) according to the demanded torque PMCMD and the engine speed NE.

Then, the process proceeds to a step 52, wherein the target throttle valve opening TH_CMD is set to the above-described first opening TH_MAP1, followed by terminating the present process.

On the other hand, if the answer to the question of the step 50 is affirmative (YES), i.e. if the actual fresh air amount QAIR has been reduced to a value close to the rich target fresh air amount QAIR_RICH, the process proceeds to a step 53, wherein a second opening TH_MAP2 is calculated. The second opening TH_MAP2 is set to satisfy the relationship of TH_MAP2>TH_MAP1, and is calculated by searching a map (not shown) according to the demanded torque PMCMD and the engine speed NE.

Next, the process proceeds to a step 54, wherein the target throttle valve opening TH_CMD is calculated by the following equation (5), followed by terminating the present process. The target throttle valve opening TH_CMD is calculated by performing first-order delay processing (weighted average processing) on the second opening TH_MAP2.

$$TH\_CMD = \alpha \cdot TH\_CMDZ + (1-\alpha)TH\_MAP2 \quad (5)$$

wherein, $\alpha$ represents a predetermined value which satisfies the relationship of $0<\alpha<1$, and TH_CMDZ represents the immediately preceding value of the target throttle valve opening.

Figure 6:
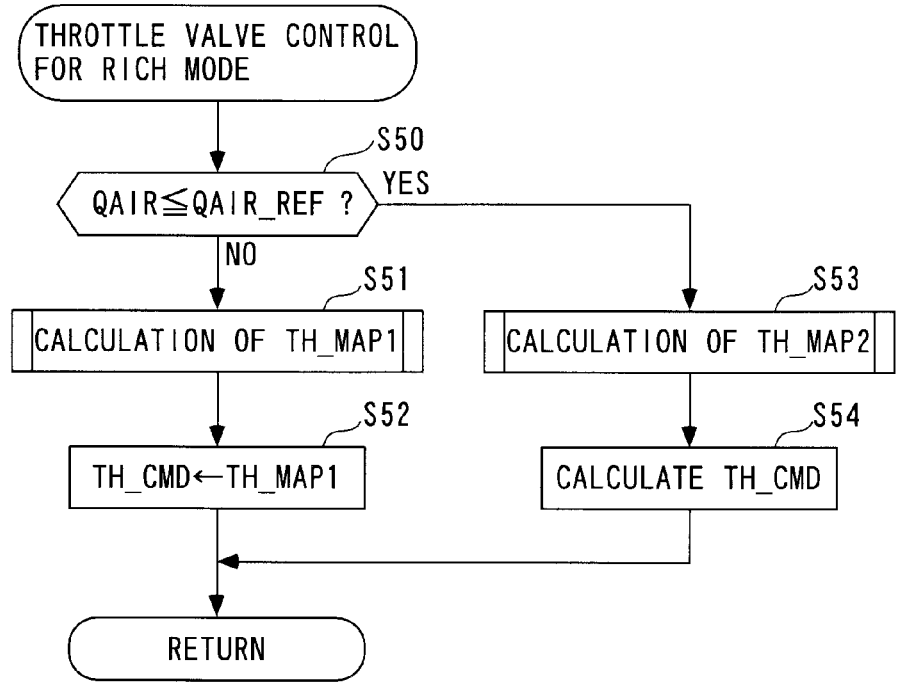
FIG. 6 is a flowchart of a throttle valve control process for the rich mode.

As described hereinabove, in the FIG. 6 process, if the degree of deviation of the actual fresh air amount QAIR from the rich target fresh air amount QAIR_RICH is large, the target throttle valve opening TH_CMD is set to the first opening TH_MAP1. This is to increase the convergence rate of the actual fresh air amount QAIR to the rich target fresh air amount QAIR_RICH when the actual fresh air amount QAIR has deviated toward the leaner side with respect to the rich target fresh air amount QAIR_RICH.

On the other hand, if the actual fresh air amount QAIR has been reduced to a value close to the rich target fresh air amount QAIR_RICH, the target throttle valve opening TH_CMD is set to a value obtained by the first-order delay processing of the second opening TH_MAP2 that is larger than the first opening TH_MAP1. This is to improve the convergence of the actual fresh air amount QAIR to the rich target fresh air amount QAIR_RICH, in the fresh air amount control. More specifically, the second opening TH_MAP2 is set to a value that is capable of optimally ensuring the convergence of the actual fresh air amount QAIR to the rich target fresh air amount QAIR_RICH, but when the target throttle valve opening TH_CMD is stepwise changed from the first opening TH_MAP1 to the second opening TH_MAP2, there is a fear that the convergence of the actual fresh air amount QAIR to the rich target fresh air amount QAIR_RICH is degraded. Therefore, the second opening TH_MAP2 is subjected to first-order delay processing to avoid the degradation of the convergence of the actual fresh air amount QAIR.

Further, when the target throttle valve opening TH_CMD is calculated as described above, a control input corresponding to the target throttle valve opening TH_CMD is supplied such that the throttle valve opening TH becomes equal to the target throttle valve opening TH_CMD.

Referring again to FIG. 4, in the step 30 following the step 29, a boost pressure control process for the rich mode is performed. More specifically, a target vane opening of the variable vanes 7c for the rich mode is calculated by searching a map (not shown) according to the demanded torque PMCMD and the engine speed NE, and a control input corresponding to a target vane opening for the rich mode is supplied to the vane actuator 7d, whereby the boost pressure is controlled.

Next, in the step 31, a swirl control process for the rich mode is carried out. More specifically, a target swirl opening of the swirl valve 9a for the rich mode is calculated by searching a map (not shown) according to the demanded torque PMCMD and the engine speed NE, and a control input corresponding to the target swirl opening for the rich mode is supplied to the swirl actuator 9b, whereby the generation state of the swirl is controlled.

Then, the process proceeds to the step 32, wherein a fuel injection control process for the rich mode is carried out to thereby calculate the fuel injection amount QINJ and the fuel injection timing φINJ, followed by terminating the present process.

Figure 7:
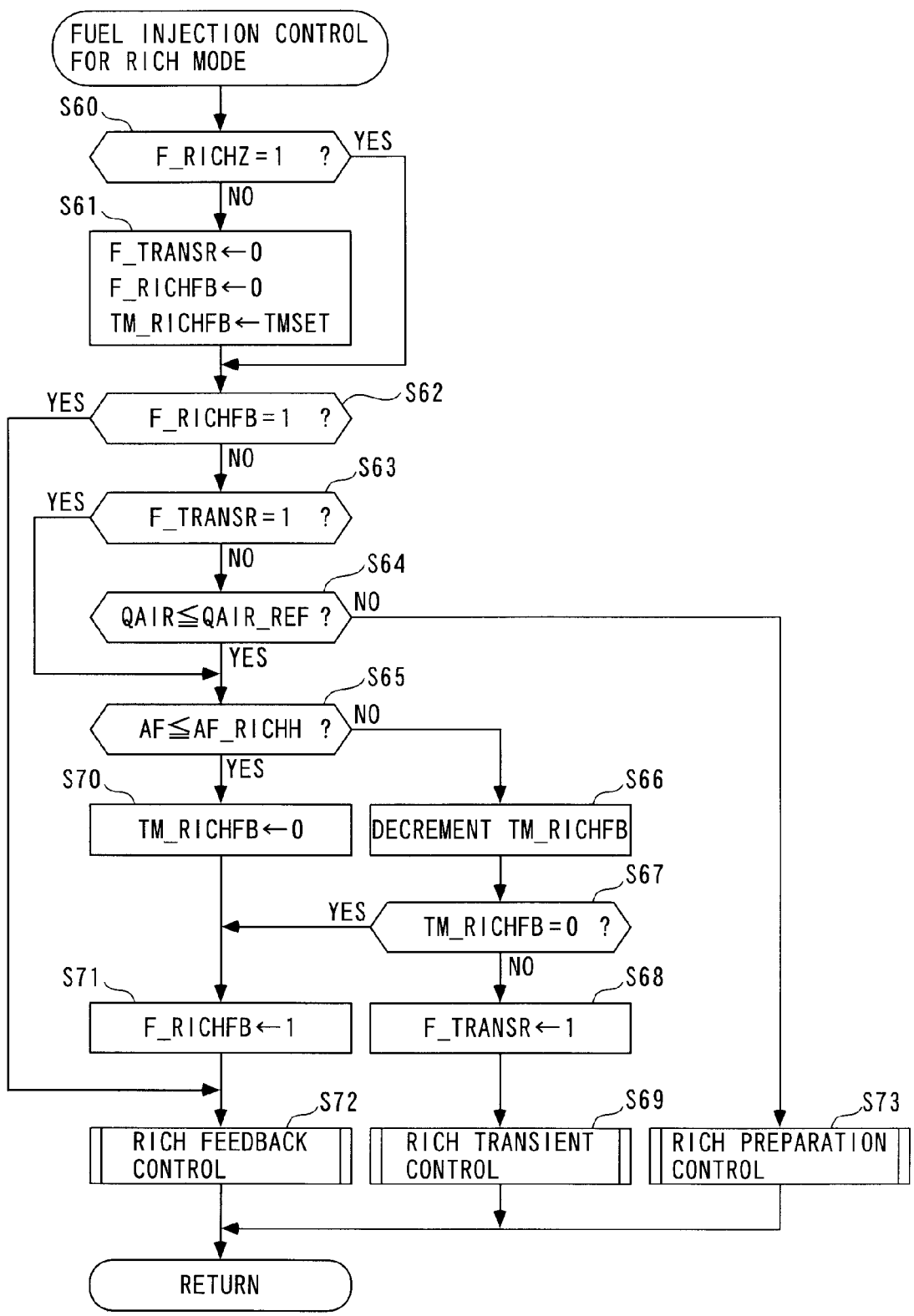
FIG. 7 is a flowchart of a fuel injection control process for the rich mode.

This fuel injection control process for the rich mode is carried by a subroutine shown in FIG. 7. First, in a step 60, it is determined whether or not the immediately preceding value F_RICHZ of the rich spike flag used in the immediately preceding loop is equal to 1.

If the answer to this question is negative (NO), i.e. if this is a first loop after switching from the lean mode to the rich mode, the process proceeds to a step 61, wherein a rich transient control flag F_TRANSR and a rich feedback control execution flag F_RICHFB are both set to 0, and the timer value TM_RICHFB of a feedback execution timer is set to a predetermined value TMSET. Then, the process proceeds to a step 62. On the other hand, if the answer to the question of the step 60 is affirmative (YES), the process directly proceeds to the step 62.

In the step 62, it is determined whether or not the rich feedback control execution flag F_RICHFB is equal to 1. If the answer to this question is negative (NO), i.e. if rich feedback control, described hereinafter, is not being executed, the process proceeds to a step 63, wherein it is determined whether or not the rich transient control flag F_TRANSR is equal to 1. If the answer to this question is negative (NO), i.e. if transient control, described hereinafter, is not being executed, the process proceeds to a step 64, wherein similarly to the aforementioned step 40, it is determined whether or not the actual fresh air amount QAIR is not larger than the threshold value QAIR_REF.

If the answer to this question is negative (NO), i.e. if the degree of deviation of the actual fresh air amount QAIR from the rich target fresh air amount QAIR_RICH is large, the process proceeds to a step 73, wherein a rich preparation control process is executed, followed by terminating the present process. In this rich preparation control process, the fuel injection amount QINJ and the fuel injection timing φINJ are calculated using the maps that were used for calculating the lean fuel injection amount QINJ_LEAN and the lean fuel injection timing φINJ_LEAN for the lean mode in the aforementioned steps 90 and 91. More specifically, in the rich preparation control process, the fuel injection amount QINJ and the fuel injection timing φINJ are set to the same values as those of the lean fuel injection amount QINJ_LEAN and the lean fuel injection timing φINJ_LEAN for the lean mode, respectively.

On the other hand, if the answer to the question of the step 64 is affirmative (YES), i.e. if the actual fresh air amount QAIR has been reduced to a value close to the rich target fresh air amount QAIR_RICH, the process proceeds to a step 65, wherein it is determined whether or not the air-fuel ratio AF is not larger than a predetermined upper limit threshold value AF_RICHH. The upper limit threshold value AF_RICHH is set to a value (e.g. 15) slightly leaner than a target air-fuel ratio AF_RICH for the rich mode.

If the answer to the question of the step 65 is negative (NO), the process proceeds to a step 66, wherein the timer value TM_RICHFB of the feedback execution timer is decremented. Next, in a step 67, it is determined whether or not the timer value TM_RICHFB is equal to 0.

If the answer to this question is negative (NO), it is judged that conditions for executing a rich transient control process are satisfied, and the process proceeds to a step 68, wherein the rich transient control flag F_TRANSR is set to 1. Hereafter, in the following loops, the answer to the question of the step 63 becomes affirmative (YES), and in this case, the process proceeds to the above-mentioned step 65.

In a step 69 following the step 68, the rich transient control process is carried out, followed by terminating the present process. In the rich transient control process, the fuel injection amount QINJ and the fuel injection timing φINJ are calculated, as described hereinafter.

First, a feedforward correction term QINJ_FF of the fuel injection amount QINJ is calculated by the following equation (6):

$$QINJ\_FF = QINJ\_FFMAP\left(1 - \frac{QAIR - QAIR\_RICH}{QAIR\_LEAN - QAIR\_RICH}\right) \quad (6)$$

wherein, QINJ_FFMAP represents a basic value of the feedforward correction term, and is calculated by searching a map (not shown) according to the rich target fresh air amount QAIR_RICH and the engine speed NE. Further, as the lean target fresh air amount QAIR_LEAN, there is used a value of the target fresh air amount calculated in the lean mode immediately before the lean mode has been switched to the rich mode. As is clear from the equation (6), the feedforward correction term QINJ_FF is calculated such that it is progressively increased to the basic value QINJ_FFMAP as the actual fresh air amount QAIR becomes closer to the rich target fresh air amount QAIR_RICH.

Next, the fuel injection amount QINJ is calculated by the following equation (7).

$$QINJ = QINJ\_MAP + QINJ\_FF \quad (7)$$

wherein QINJ_MAP represents a basic fuel injection amount, which is calculated by searching a map (not shown) according to the demanded torque PMCMD and the engine speed NE.

As shown in the equation (7), the fuel injection amount QINJ is set as the sum of the basic fuel injection amount QINJ_MAP and the feedforward correction term QINJ_FF. As described above, the feedforward correction term QINJ_FF is calculated such that it is progressively increased to the basic value QINJ_FFMAP, and hence the fuel injection amount QINJ is set such that it is progressively increased from the basic fuel injection amount QINJ_MAP to a value (QINJ_MAP+QINJ_FFMAP) as the actual fresh air amount QAIR becomes closer to the rich target fresh air amount QAIR_RICH.

Next, a correction coefficient K2 of the fuel injection timing φINJ is calculated by the following equation (8):

$$k2 = \frac{QAIR\_LEAN - QAIR}{QAIR\_LEAN - QAIR\_RICH} \quad (8)$$

wherein as the lean target fresh air amount QAIR_LEAN, there is used a value of the target fresh air amount calculated in the lean mode immediately before the lean mode has been switched to the rich mode. As is clear from comparison between the equation (8) and the aforementioned equation (3), the correction coefficient K2 represents the degree of approach of the actual fresh air amount QAIR to the rich target fresh air amount QAIR_RICH from the lean target fresh air amount QAIR_LEAN.

Then, the fuel injection timing φINJ is calculated by the following equation (9).

$$INJ = \phi INJ\_LEAN + k2(\phi INJ\_RICH - \phi INJ\_LEAN) \quad (9)$$

wherein φINJ_RICH represents the rich fuel injection timing for the rich mode, and is calculated by searching a map (not shown) according to the fuel injection amount QINJ calculated by the aforementioned equation (7) and the engine speed NE. It should be noted that in this map, the rich fuel injection timing φINJ_RICH is set to a more advanced value than the lean fuel injection timing φINJ_LEAN for the lean mode in the whole areas of the fuel injection amount QINJ and the engine speed NE. This is to avoid an ignition delay in the rich mode since the amount of fresh air supplied to the cylinders 3a is small in the rich mode. Further, φINJ_LEAN represents the lean fuel injection timing for the lean mode, and in the present case, as the lean fuel injection timing φINJ_LEAN, there is used a value of the fuel injection timing calculated in the lean mode immediately before the lean mode has been switched to the rich mode.

As is clear from comparison between the equation (9) and the aforementioned equation (4), the second term (k2(φIN-J_RICH−φINJ_LEAN)) on the right side of the equation (9) represents the amount of correction of the fuel injection timing φINJ corresponding to the degree of approach of the actual fresh air amount QAIR to the rich target fresh air amount QAIR_RICH. By adding the second term to the lean fuel injection timing φINJ_LEAN for the lean mode using the equation (9), the fuel injection timing φINJ is corrected such that the degree of correction thereof matches the degree of approach of the actual fresh air amount QAIR to the rich target fresh air amount QAIR_RICH. Therefore, if the fuel injection timing φINJ is corrected as described above, similarly to the above-described correction of the fuel injection timing φINJ during execution of the lean transient control, it is possible to set the fuel injection timing φINJ to an appropriate value corresponding to the actual degree of delay of the actual fresh air amount QAIR.

On the other hand, if the answer to the question of the step 65 is affirmative (YES), i.e. if AF≦AF_RICHH holds, it is judged that a rich feedback control process should be executed, and the process proceeds to a step 70, wherein the timer value TM_RICHFB of the feedback execution timer is reset to 0. Then, the process proceeds to a step 71, wherein the rich feedback control execution flag F_RICHFB is set to 1, and then the process proceeds to a step 72. Hereafter, in the following loops, the answer to the question of the step 62 becomes affirmative (YES), and in this case, the process directly proceeds to the step 72.

In the step 72, the rich feedback control process is executed. More specifically, the fuel injection amount QINJ and the fuel injection timing φINJ are calculated as described hereinafter.

First, the feedforward correction term QINJ_FF of the fuel injection amount QINJ is calculated by the following equation (10):

$$QINJ\_FF = QINJ\_FFMAP \cdot \frac{QAIR}{QAIR\_RICH} \quad (10)$$

As shown in the equation (10), the feedforward correction term QINJ_FF is calculated by multiplying the basic value QINJ_FFMAP of the feedforward correction term by a ratio between the actual fresh air amount and the rich target fresh air amount (QAIR/QAIR_RICH). This is because when the accelerator pedal opening AP is suddenly changed to rapidly accelerate or decelerate the engine, if the fuel injection timing φINJ is corrected only by a feedback correction term QINJ_FB, referred to hereinafter, the convergence of the actual fresh air amount QAIR to the rich target fresh air amount QAIR_RICH can be degraded to degrade drivability and increase exhaust emissions. Therefore, the above multiplication is performed to compensate for the degraded drivability and the increased exhaust emissions.

Next, the fuel injection amount QINJ is calculated by the following equation (11):

$$QINJ = (QINJ\_MAP + QINJ\_FF) \cdot (1 + QINJ\_FB) \quad (11)$$

wherein QINJ_FB represents the feedback correction term of the fuel injection amount QINJ, which is calculated with a predetermined feedback control algorithm such that the air-fuel ratio AF converges to the target air-fuel ratio AF_RICH for the rich mode. More specifically, in the rich feedback control process, the fuel injection amount QINJ is feedback-controlled such that the air-fuel ratio AF converges to the rich target air-fuel ratio AF_RICH. In this case, a limiting process is carried out such that the air-fuel ratio AF is within a range defined by the upper limit threshold value AF_RICHH and a lower limit threshold value AF_RICHL. Further, the rich target air-fuel ratio AF_RICH is set to a predetermined value (e.g. 14).

Then, the rich fuel injection timing φINJ_RICH for the rich mode is calculated by searching a map (not shown) according to the fuel injection amount QINJ calculated by the aforementioned equation (11) and the engine speed NE, and is set to the fuel injection timing φINJ. It should be noted that in this map, the rich fuel injection timing φINJ_RICH is set to a more advanced value than the lean fuel injection timing φINJ_LEAN for the lean mode in the whole areas of the fuel injection amount QINJ and the engine speed NE. After thus executing the step 72, the present process is terminated.

On the other hand, if the answer to the question of the step 67 is affirmative (YES), i.e. if AF>AF_RICHH holds and when a time period corresponding to the above-described predetermined value TMSET has elapsed, it is judged that the rich feedback control process should be executed, and the steps 71 and 72 are executed, followed by terminating the present process.

Figure 12:
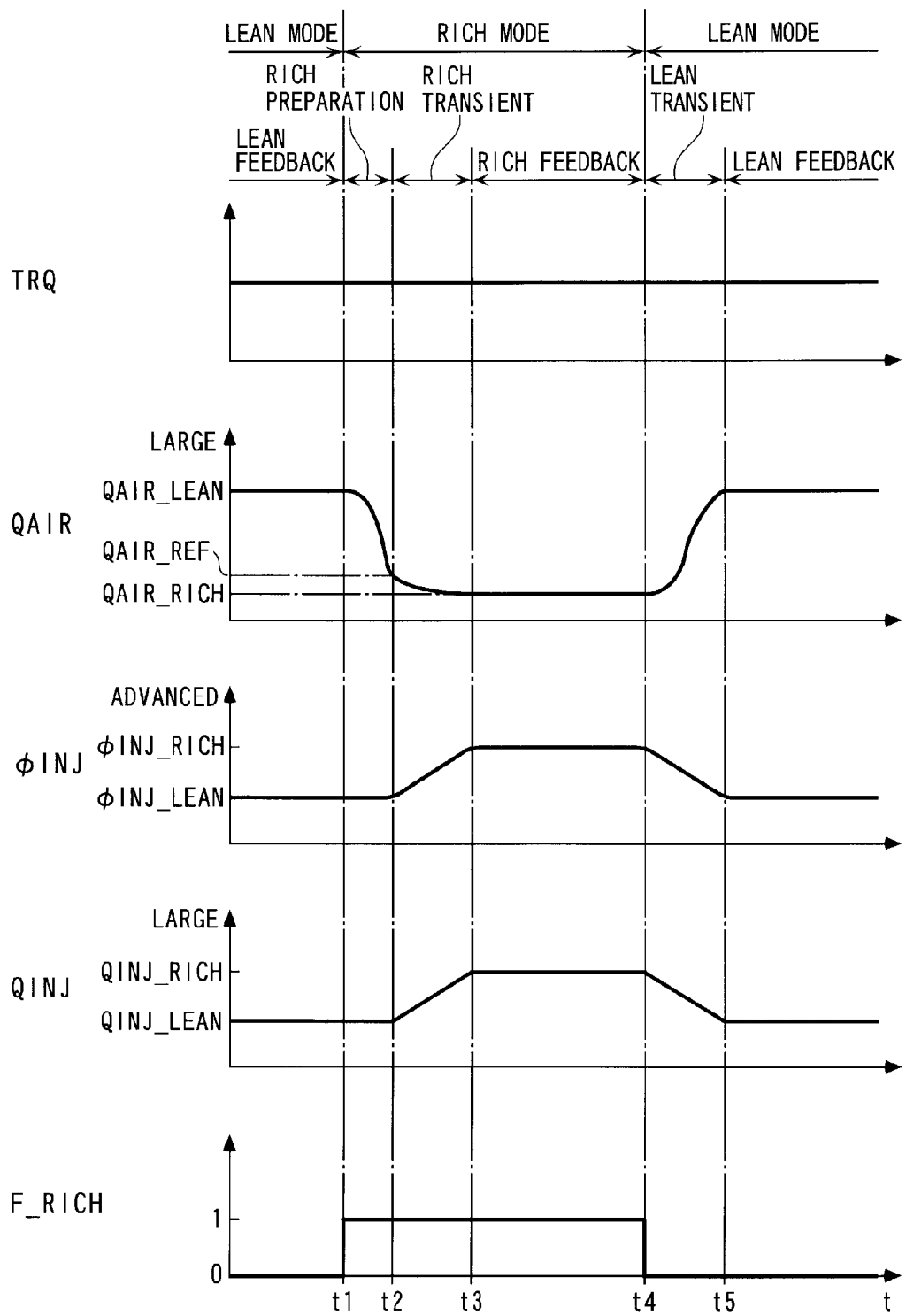
FIG. 12 is a timing diagram showing an example of operation of the control system realized by the engine control process.

FIG. 12 shows an example of operation of the control system realized by the engine control process according to the present embodiment. It should be noted that TRQ appearing in FIG. 12 represents torque generated by the engine 3.

First, in the lean mode before time t1, the actual fresh air amount QAIR is feedback-controlled to the lean target fresh air amount QAIR_LEAN by the lean feedback control (step 85), while the fuel injection amount QINJ and the fuel injection timing φINJ are controlled to the lean fuel injection amount QINJ_LEAN and the lean fuel injection timing φINJ_LEAN for the lean mode.

If the conditions for executing the rich spike control are satisfied, when the rich spike flag F_RICH is switched from 0 to 1, and the air-fuel ratio mode is switched to the rich mode, the target fresh air amount is accordingly set to a smaller rich target fresh air amount QAIR_RICH, and the actual fresh air amount QAIR is progressively reduced toward the rich target fresh air amount QAIR_RICH. At this time, the fuel injection amount QINJ and the fuel injection timing φINJ are held at the lean fuel injection amount QINJ_LEAN and the lean fuel injection timing φINJ_LEAN by the rich preparation control (step 73) for the lean mode, respectively.

When the actual fresh air amount QAIR becomes lower than the predetermined value QAIR_REF (t2), the fuel injection amount QINJ is progressively increased by the rich transient control (step 69). Further, during execution of the rich transient control, as the actual fresh air amount QAIR is progressively reduced toward the rich target fresh air amount QAIR_RICH, the fuel injection timing φINJ is progressively controlled from the lean fuel injection timing φINJ_LEAN for the lean mode to a more advanced value. In this case, the fuel injection timing φINJ is calculated by the equation (9) using the correction coefficient K2 that is calculated by the equation (8) and represents the degree of approach of the actual fresh air amount QAIR to the rich target fresh air amount QAIR_RICH from the lean target fresh air amount QAIR_LEAN, whereby the fuel injection timing φINJ is set to a value corresponding to the actual degree of delay of the actual fresh air amount QAIR. As a result, torque TRQ is held approximately constant without almost suffering from the change.

After that, when the actual fresh air amount QAIR has converged to the rich target fresh air amount QAIR_RICH (t3), the rich feedback control (step 72) is started to feedback-control the fuel injection amount QINJ such that the air-fuel ratio AF converges to the target air-fuel ratio AF_RICH for the rich mode Then, when the time period for execution of the rich spike control ends (t4), F_RICH=0 holds, and the rich mode is switched to the lean mode to execute the lean transient control (step 86). In accordance therewith, a lean target fresh air amount QAIR_LEAN, which is larger, is set to the target fresh air amount. As the actual fresh air amount QAIR is progressively increased toward the lean target fresh air amount QAIR_LEAN, the fuel injection amount QINJ is progressively reduced. Further, the fuel injection timing φINJ is progressively controlled to a more retarded value from the rich fuel injection timing φINJ_RICH for the rich mode. In this case, the fuel injection timing φINJ is calculated by the equation (4) using the correction coefficient K1 that is calculated by the equation (3) and represents the degree of approach of the actual fresh air amount QAIR to the lean target fresh air amount QAIR_LEAN from the rich target fresh air amount QAIR_RICH, whereby the fuel injection timing φINJ is set to a value corresponding to the actual degree of delay of the actual fresh air amount QAIR. As a result, the torque TRQ is held approximately constant.

After that, when the actual fresh air amount QAIR has converged to the lean target fresh air amount QAIR_LEAN (t5), the lean feedback control is carried out, as before the time t1.

As described hereinabove, according to the present embodiment, when the air-fuel ratio mode is switched to the lean mode, the fuel injection timing φINJ is calculated according to the degree of approach of the actual fresh air amount QAIR to the lean target fresh air amount QAIR_LEAN, whereas when the air-fuel ratio mode is switched to the rich mode, the fuel injection timing φINJ is calculated according to the degree of approach of the actual fresh air amount QAIR to the rich target fresh air amount QAIR_RICH. This makes it possible to set the fuel injection timing φINJ to an appropriate value corresponding to the actual degree of delay of the actual fresh air amount QAIR, thereby making it possible to positively suppress torque variation upon switching of the air-fuel ratio mode.

It should be noted that the present invention is by no means limited to the embodiment described above, but it can be practiced in various forms. For example, although in the above-described embodiment, when the air-fuel ratio mode is switched to the rich mode, correction of the fuel injection timing φINJ in the rich transient control is carried out according to the actual fresh air amount QAIR after the rich preparation control, this is not limitative, but the above correction may be performed immediately after switching to the rich mode, similarly to the case of switching to the lean mode. Further, although in the above-described embodiment, correction of the fuel injection timing φINJ in the transient control is performed both in switching to the lean mode and switching to the rich mode, the correction may be performed either in switching to the lean mode or switching to the rich mode.

Furthermore, although in the above-described embodiment, an air-fuel ratio mode, which controls the air-fuel ratio to a leaner value than the stoichiometric air-fuel ratio during normal operation of the diesel engine, is set as the lean mode, and an air-fuel ratio mode, which controls the air-fuel ratio to a richer value than the stoichiometric air-fuel ratio for execution of the rich spike control, is set as the rich mode, by way of example, this is not limitative, but the rich mode and the lean mode may be any modes in which the air fuel ratio are set to respective target values largely different relative to each other. For example, they may be a very lean mode and a very rich mode.

Further, although in the above-described embodiment, the fuel injection timing is corrected upon switching of the air-fuel ratio mode such that the degree of the correction thereof fully matches the degree of approach of the actual fresh air amount to a target fresh air amount in a mode to which the air-fuel ratio mode has been switched, this is not limitative, but any other suitable method may be employed insofar as it properly reflects the actual degree of delay of the actual fresh air amount. For example, a method may be used in which the fuel injection timing is corrected based on the difference between the current target fresh air amount and a target fresh air amount in a mode to which the air-fuel ratio has been switched.

Furthermore, although in the above-described embodiment, the present invention is applied to the diesel engine installed on a vehicle, this is not limitative, but the present invention can be applied to various types of engines, such as a gasoline engine. Further, the present invention can be applied to engines other than engines for vehicles, including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A control system for an internal combustion engine, for controlling an amount of fresh air to be supplied to a cylinder and an amount of fuel to be supplied to the cylinder to thereby control an air-fuel ratio of a mixture in the cylinder such that an air-fuel ratio mode is switched between a lean mode in which the air-fuel ratio is controlled to a lean side air-fuel ratio and a rich mode in which the air-fuel ratio is controlled to a rich side air-fuel ratio a richer than the lean side air-fuel ratio, comprising:

fresh air amount-detecting means for detecting the amount of fresh air;

lean-mode target fresh air amount-setting means for setting a target fresh air amount for the lean mode, which serves as a target of the fresh air amount in the lean mode;

lean-mode fresh air amount controlling means for controlling the fresh air amount such that the fresh air amount becomes the set target fresh air amount for the lean mode, in the lean mode;

rich-mode target fresh air amount-setting means for setting a target fresh air amount for the rich mode, which serves as a target of the fresh air amount in the rich mode;

rich-mode fresh air amount controlling means for controlling the fresh air amount such that the fresh air amount becomes the set target fresh air amount for the rich mode, in the rich mode;

operating condition-detecting means for detecting an operating condition of the engine;

fuel injection timing-setting means for setting fuel injection timing of the fuel to be supplied to the cylinder according to the detected operating condition of the engine; and fuel injection timing-correcting means for correcting the fuel injection timing according to a difference between the target fresh air amount calculated immediately before switching of the air-fuel ratio mode, and the detected fresh air amount, upon switching of the air-fuel ratio mode.

2. A control method for an internal combustion engine, for controlling an amount of fresh air to be supplied to a cylinder and an amount of fuel to be supplied to the cylinder to thereby control an air-fuel ratio of a mixture in the cylinder such that an air-fuel ratio mode is switched between a lean mode in which the air-fuel ratio is controlled to a lean side air-fuel ratio and a rich mode in which the air-fuel ratio is controlled to a rich side air-fuel ratio richer than the lean side air-fuel ratio, comprising:

- a fresh air amount-detecting step of detecting the amount of fresh air;
- a lean-mode target fresh air amount-setting step of setting a target fresh air amount for the lean mode, which serves as a target of the fresh air amount in the lean mode;
- a lean-mode fresh air amount controlling step of controlling the fresh air amount such that the fresh air amount becomes the set target fresh air amount for the lean mode, in the lean mode;
- a rich-mode target fresh air amount-setting step of setting a target fresh air amount for the rich mode, which serves as a target of the fresh air amount in the rich mode;
- a rich-mode fresh air amount controlling step of controlling the fresh air amount such that the fresh air amount becomes the set target fresh air amount for the rich mode, in the rich mode;
- an operating condition-detecting step of detecting an operating condition of the engine;
- a fuel injection timing-setting step of setting fuel injection timing of the fuel to be supplied to the cylinder according to the detected operating condition of the engine; and
- a fuel injection timing-correcting step of correcting the fuel injection timing according to a difference between the target fresh air amount calculated immediately before switching of the air-fuel ratio mode, and the detected fresh air amount, upon switching of the air-fuel ratio mode.

3. An engine control unit including a control program for causing a compute to execute a control method for an internal combustion engine, for controlling an amount of fresh air to be supplied to a cylinder and an amount of fuel to be supplied to the cylinder to thereby control an air-fuel ratio of a mixture in the cylinder such that an air-fuel ratio mode is switched between a lean mode in which the air-fuel ratio is controlled to a lean side air-fuel ratio and a rich mode in which the air-fuel ratio is controlled to a rich side air-fuel ratio richer than the lean side air-fuel ratio, comprising:

- a fresh air amount-detecting step of detecting the amount of fresh air;
- a lean-mode target fresh air amount-setting step of setting a target fresh air amount for the lean mode, which serves as a target of the fresh air amount in the lean mode;
- a lean-mode fresh air amount controlling step of controlling the fresh air amount such that the fresh air amount becomes the set target fresh air amount for the lean mode, in the lean mode;
- a rich-mode target fresh air amount-setting step of setting a target fresh air amount for the rich mode, which serves as a target of the fresh air amount in the rich mode;
- a rich-mode fresh air amount controlling step of controlling the fresh air amount such that the fresh air amount becomes the set target fresh air amount for the rich mode, in the rich mode;
- an operating condition-detecting step of detecting an operating condition of the engine;
- a fuel injection timing-setting step of setting fuel injection timing of the fuel to be supplied to the cylinder according to the detected operating condition of the engine; and
- a fuel injection timing-correcting step of correcting the fuel injection timing according to a difference between the target fresh air amount calculated immediately before switching of the air-fuel ratio mode, and the detected fresh air amount, upon switching of the air-fuel ratio mode.

* * * * *